(12) United States Patent
Gabrenya et al.

(10) Patent No.: US 12,062,354 B2
(45) Date of Patent: Aug. 13, 2024

(54) SYSTEMS, DEVICES, AND METHODS FOR MUSICAL CATALOG AMPLIFICATION SERVICES

(71) Applicant: Obeebo Labs Ltd., Petaluma, CA (US)

(72) Inventors: Gregory Gabrenya, Petaluma, CA (US); Colin P Williams, Half Moon Bay, CA (US)

(73) Assignee: Obeebo Labs Ltd., Waterloo (CA)

( * ) Notice: Subject to any disclaimer, the term of this patent is extended or adjusted under 35 U.S.C. 154(b) by 0 days.

(21) Appl. No.: 18/123,901

(22) Filed: Mar. 20, 2023

(65) Prior Publication Data
US 2023/0230565 A1    Jul. 20, 2023

Related U.S. Application Data

(63) Continuation of application No. 16/914,106, filed on Jun. 26, 2020, now Pat. No. 11,615,772.
(Continued)

(51) Int. Cl.
  *G10H 1/00* (2006.01)
  *G06F 16/65* (2019.01)
  (Continued)

(52) U.S. Cl.
  CPC .......... *G10H 1/0025* (2013.01); *G06F 16/65* (2019.01); *G06Q 40/12* (2013.12); *G06Q 50/184* (2013.01);
  (Continued)

(58) Field of Classification Search
  CPC .. G10H 1/0025; G10H 1/0008; G10H 1/0041; G10H 7/08; G10H 2210/031; G10H 2210/056; G10H 2210/061; G10H 2210/071; G10H 2210/111; G10H 2210/131; G10H 2210/145;
  (Continued)

(56) References Cited

U.S. PATENT DOCUMENTS 5,980,262 A  * 11/1999  Tseng .................... G10H 1/368
                                                84/610
11,024,276 B1 *  6/2021  Dabby ................ G10H 1/0025
(Continued)

FOREIGN PATENT DOCUMENTS

WO     WO-2011008418 A3 *  5/2011  ............. G06F 21/10

*Primary Examiner* — Jianchun Qin
(74) *Attorney, Agent, or Firm* — Thomas Mahon

(57) ABSTRACT

Musical catalog amplification services that leverage or deploy a computer-based musical composition system are described. The computer-based musical composition system employs algorithms and, optionally, artificial intelligence to generate new music based on analyses of existing music. The new music may be wholly distinctive from, or may include musical variations of, the existing music. Rights in the new music generated by the computer-based musical composition system are granted to the rights holder(s) of the existing music. In this way, the musical catalog(s) of the rights holder(s) is/are amplified to include additional music assets. The computer-based musical composition system may be tuned so that the new music sounds more like, or less like, the existing music of the rights holder(s). Revenues generated from the new music are shared between the musical catalog amplification service provider and the rights holder(s).

20 Claims, 6 Drawing Sheets

Related U.S. Application Data

(60) Provisional application No. 62/968,963, filed on Jan. 31, 2020.

(51) Int. Cl.
  *G06Q 40/12* (2023.01)
  *G06Q 50/18* (2012.01)
  *G10H 7/08* (2006.01)

(52) U.S. Cl.
  CPC ......... *G10H 1/0008* (2013.01); *G10H 1/0041* (2013.01); *G10H 7/08* (2013.01); *G10H 2210/031* (2013.01); *G10H 2210/056* (2013.01); *G10H 2210/061* (2013.01); *G10H 2210/071* (2013.01); *G10H 2210/111* (2013.01); *G10H 2210/131* (2013.01); *G10H 2210/145* (2013.01); *G10H 2250/005* (2013.01); *G10H 2250/215* (2013.01)

(58) Field of Classification Search
  CPC ....... G10H 2250/005; G10H 2250/215; G06Q 40/12; G06Q 50/184; G06F 16/65
  See application file for complete search history.

(56) References Cited

U.S. PATENT DOCUMENTS

| 2011/0099096 A1* | 4/2011 | Shanley | G06Q 50/184 |
| | | | 705/310 |
| 2012/0123831 A1* | 5/2012 | King | A63H 5/00 |
| | | | 707/769 |

* cited by examiner

SYSTEMS, DEVICES, AND METHODS FOR MUSICAL CATALOG AMPLIFICATION SERVICES

TECHNICAL FIELD

The present systems, devices, and methods generally relate to computer-generated music, and particularly relate to musical catalog amplification services that deploy or leverage a computer-based musical composition capability.

BACKGROUND

Description of the Related Art

Composing Musical Compositions

A musical composition may be characterized by sequences of sequential, simultaneous, and/or overlapping notes that are partitioned into one or more tracks. Starting with an original musical composition, a new musical composition or "variation" can be composed by manipulating the "elements" (e.g., notes, bars, tracks, arrangement, etc.) of the original composition. As examples, different notes may be played at the original times, the original notes may be played at different times, and/or different notes may be played at different times. Further refinements can be made based on many other factors, such as changes in musical key and scale, different choices of chords, different choices of instruments, different orchestration, changes in tempo, the imposition of various audio effects, changes to the sound levels in the mix, and so on.

In order to compose a new musical composition (or variation) based on an original or previous musical composition, it is typically helpful to have a clear characterization of the elements of the original musical composition. In addition to notes, bars, tracks, and arrangements, "segments" may also be important elements of a musical composition. In this context, the term "segment" (or "musical segment") is used to refer to a particular sequence of bars (i.e., a subset of serially-adjacent bars) that represents or corresponds to a particular section or portion of a musical composition. A musical segment may include, for example, an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition.

Digital Audio File Formats

While it is common for human musicians to communicate musical compositions in the form of sheet music, it is notably uncommon for computers to do so. Computers typically store and communicate music in well-established digital audio file formats, such as .mid, .wav, or .mp3 (just to name a few), that are designed to facilitate communication between electronic instruments and other devices by allowing for the efficient movement of musical waveforms over computer networks. In a digital audio file format, audio data is typically encoded in one of various audio coding formats (which may be compressed or uncompressed) and either provided as a raw bitstream or, more commonly, embedded in a container or wrapper format.

BRIEF SUMMARY

A method of leveraging a computer-based musical composition system to provide a musical catalog amplification service may be summarized as including: analyzing, by the computer-based musical composition system, existing music owned by at least one rights holder; generating, by the computer-based musical composition system, new music based at least in part on the existing music; granting at least some rights in the new music to the at least one rights holder; and sharing revenues generated from the new music with the at least one rights holder. Analyzing, by the computer-based musical composition system, existing music owned by at least one rights holder may include determining, by the computer-based musical composition system, at least one feature of at least one musical composition in the existing music. Generating, by the computer-based musical composition system, new music based at least in part on the existing music may include generating, by the computer-based musical composition system, at least one new musical composition based at least in part on the at least one feature of at least one musical composition in the existing music. The existing music may include a catalog of musical compositions and generating, by the computer-based musical composition system, new music based at least in part on the existing music may include generating, by the computer-based musical composition system, at least one new musical composition based at least in part on at least one musical composition in the catalog of musical compositions. Generating, by the computer-based musical composition system, at least one new musical composition based at least in part on at least one musical composition in the catalog of musical compositions may include generating, by the computer-based musical composition system, at least one musical variation of at least one musical composition in the catalog of musical compositions.

Granting at least some rights in the new music to the at least one rights holder may include licensing the new music to the at least one rights holder. Alternatively, granting at least some rights in the new music to the at least one rights holder may include assigning ownership of the new music to the at least one rights holder, and the method may further include licensing the new music from the at least one rights holder.

Analyzing, by the computer-based musical composition system, existing music owned by at least one rights holder may include analyzing, by the computer-based musical composition system, at least a first musical composition owned, at least in part, by a first rights holder and analyzing, by the computer-based musical composition system, at least a second musical composition owned, at least in part, by a second rights holder. Generating, by the computer-based musical composition system, new music based at least in part on the existing music may include generating, by the computer-based musical composition system, at least one new musical composition based, at least in part, on both the first musical composition and the second musical composition. Granting at least some rights in the new music to the at least one rights holder may include granting at least some rights in the at least one new musical composition to both the first rights holder and the second rights holder. Sharing revenues generated from the new music with the at least one rights holder may include sharing revenues generated from the at least one new musical composition with both the first rights holder and the second rights holder.

The existing music may comprise music from at least a first artist and the method may further include generating revenues from the new music, wherein generating revenues from the new music includes associating the new music with the first artist to promote the new music across royalty channels.

The method may further include generating revenues from the new music, wherein generating revenues from the new music includes: defining a new artist on at least one music streaming service; releasing the new music on the at least one music streaming service, wherein releasing the new music on the at least one music streaming service includes at least partially attributing the new music to the new artist on the at least one music streaming service; and receiving revenues from the at least one music streaming service according to a royalty model of the at least one music streaming service.

The method may further include: accessing, by the computer-based musical composition system, the existing music in at least a first digital file format; and converting, by the computer-based musical composition system, the existing music from the at least a first digital file format to a second digital file format before analyzing, by the computer-based musical composition, the existing music.

A method of operating a musical catalog amplification service may be summarized as including: accessing a first catalog of musical content by a computer-based musical composition system, the musical content comprising at least one musical composition owned by at least a first rights holder; processing the musical content by the computer-based musical composition system; generating a set of new musical compositions by the computer-based musical composition system, the set of new musical compositions comprising at least one new musical composition and each new musical composition in the set of new musical compositions based at least in part on the musical content in the first catalog of musical content; adding the set of new musical compositions to the first catalog of musical content; and sharing revenues generated from the set of new musical compositions with the first rights holder. Accessing a first catalog of musical content by a computer-based musical composition system may include accessing, by the computer-based musical composition system, the musical content in the first catalog of musical content in at least a first digital file format. Processing the musical content by the computer-based musical composition system may include converting, by the computer-based musical composition system, the musical content in the first catalog of musical content from the at least a first digital file format to a second digital file format.

Processing the musical content by the computer-based musical composition system may include analyzing, by the computer-based musical composition system, the musical content to determine at least one feature of the musical content. Generating a set of new musical compositions by the computer-based musical composition system may include generating a set of new musical compositions by the computer-based musical composition system where each new musical composition in the set of new musical compositions is based at least in part on or applies at least one feature of the musical content determined by the computer-based musical composition system.

Generating a set of new musical compositions by the computer-based musical composition system may include generating, by the computer-based musical composition system, at least one musical variation of at least one musical composition in the first catalog of musical content.

Adding the set of new musical compositions to the first catalog of musical content may include granting at least some rights in the set of new musical compositions to the at least one rights holder. Granting at least some rights in the set of new musical compositions to the at least one rights holder may include either: licensing the set of new musical compositions to the at least one rights holder; or assigning ownership of the set of new musical compositions to the at least one rights holder and licensing the set of new musical compositions from the at least one rights holder.

The method may further include: accessing a second catalog of musical content by the computer-based musical composition system, the musical content in the second catalog of musical content comprising at least one musical composition owned by at least a second rights holder; processing the musical content in the second catalog of musical content by the computer-based musical composition system; adding the set of new musical compositions to the second catalog of musical content; and sharing revenues generated from the set of new musical compositions with the second rights holder, wherein: generating a set of new musical compositions by the computer-based musical composition system includes generating the set of new musical compositions by the computer-based musical composition system, each new musical composition in the set of new musical compositions based at least in part on both the musical content in the first catalog of musical content and the musical content in the second catalog of musical content.

The first catalog of musical content may comprise music from at least a first artist and the method may further include generating revenues from the set of new musical compositions, wherein generating revenues from the set of new musical compositions includes associating the set of new musical compositions with the first artist to promote the set of new musical compositions across royalty channels.

The method may further include generating revenues from the set of new musical compositions, wherein generating revenues from the set of new musical compositions includes: defining a new artist on at least one music streaming service; releasing the set of new musical compositions on the at least one music streaming service, wherein releasing the set of new musical compositions on the at least one music streaming service includes attributing the set of new musical compositions to the new artist on the at least one music streaming service; and receiving revenues from the at least one music streaming service according to a royalty model of the at least one music streaming service.

Generating a set of new musical compositions by the computer-based musical composition system may include generating a first set of new musical compositions by the computer-based musical composition system. Sharing revenues generated from the set of new musical compositions with the first rights holder may include sharing a first portion of revenues generated from the first set of new musical compositions with the first rights holder, and the method may further include: generating a second set of new musical compositions by the computer-based musical composition system, each new musical composition in the second set of new musical compositions based at least in part on at least one new musical composition in the first set of new musical compositions; adding the second set of new musical compositions to the first catalog of musical content; and sharing a second portion of revenues generated from the second set of new musical compositions with the first rights holder, the second portion of revenues less than the first portion of revenues.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
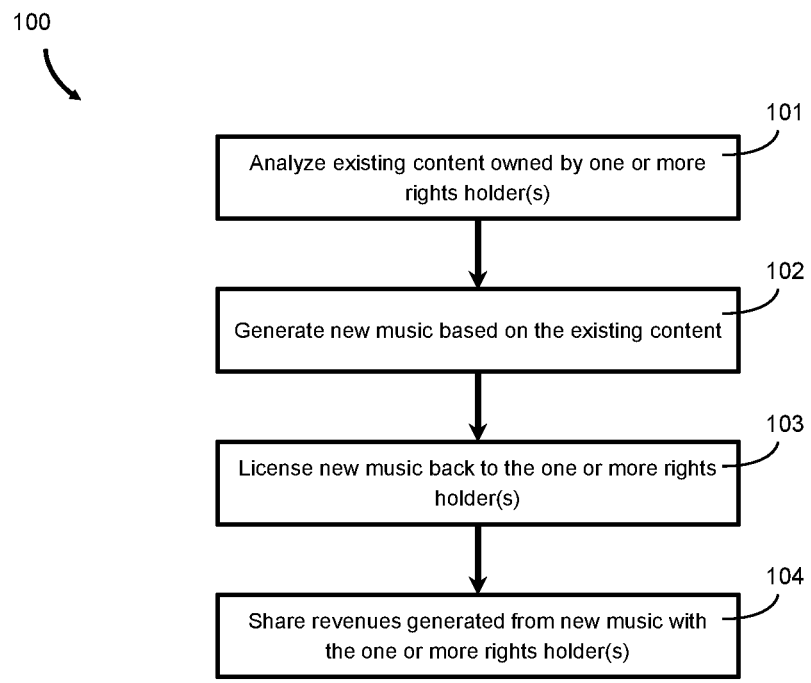
FIG. 1 is a flow diagram showing an exemplary method of leveraging new music as a catalog amplification service provider in accordance with the present systems, devices, and methods.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide systems, devices, and methods for employing a computer-based musical composition capability/system to provide a musical catalog amplification service.

The computer-based musical composition capability or system described herein may employ a wide range of techniques and/or algorithms for processing music. As examples, the computer-based musical composition systems described herein may employ any or all of: the systems, devices, and methods for encoding musical compositions in hierarchical data structures of the form Music[Segments{ }, barsPerSegment{ }] that are described in U.S. Pat. No. 10,629,176, filed Jun. 21, 2019 and entitled "Systems, Devices, and Methods for Digital Representations of Music"; the systems, devices, and methods for automatically identifying the musical segments of a musical composition that are described in U.S. patent application Ser. No. 16/775,241, filed Jan. 28, 2020 and entitled "Systems, Devices, and Methods for Segmenting a Musical Composition into Musical Segments;" the systems, devices, and methods for identifying harmonic structure in digital data structures and for mapping the Music[Segments{ }, barsPerSegment{ }] data structure into an isomorphic HarmonicStructure[Segments{ }, harmonicSequencePerSegment{ }] data structure that are described in U.S. patent application Ser. No. 16/775,254, filed Jan. 28, 2020 and entitled "Systems, Devices, and Methods for Harmonic Structure in Digital Representations of Music;" and/or any or all of the systems, devices, and methods described in U.S. Provisional Patent Application Ser. No. 62/968,963, filed Jan. 31, 2020 and entitled "Systems, Devices, and Methods for Computer-Generated Musical Compositions," all of which are incorporated by reference herein in their entirety.

In relation to the references incorporated above, the various embodiments described herein include systems, devices, and methods that may, among other things, use Music[Segments{ }, barsPerSegment{ }] data structures and HarmonicStructure[Segments{ }, harmonicSequencePerSegment{ }] data structures to create, compose, and/or generate variations of the note sequences within the musical bars (i.e., within the bar data objects encoded in the data structures) of existing musical compositions to generate: i) new musical compositions that are variations on one or more existing musical composition(s); and/or ii) new musical compositions that are, for all intents and purposes, original musical compositions.

Throughout this specification and the appended claims, reference is often made to "musical catalog amplification" and a "musical catalog amplification service." Unless the specific context requires otherwise, "musical catalog amplification" generally refers to increasing the volume/quantity of songs, music, musical pieces, musical compositions, or generally "musical content" in a collection, portfolio, library, or generally "catalog" of musical content. More specifically, a "musical catalog" may include a set of discrete music assets and "musical catalog amplification" is a process by which additional discrete music assets are added to the set. A "musical catalog amplification service" is a service that provides musical catalog amplification and a "musical catalog amplification service provider" is a service provider that provides a musical catalog amplification service.

For example, an artist (i.e., an individual or a band) may have a portfolio comprising a first number of songs or musical compositions (i.e., "music assets") that the artist has generated, and a musical catalog amplification service provider may assist the artist in generating additional songs or musical compositions to grow, expand, or generally "amplify" their portfolio such that the portfolio comprises a second number of music assets that is greater than the first number of music assets. Similarly, a record label (or music production company) may have a portfolio comprising a third number of music assets (e.g., including music assets from multiple artists) and a musical catalog amplification service provider may assist the record label in generating additional songs or musical compositions to grow, expand, or generally "amplify" their portfolio such that the portfolio comprises a fourth number of music assets that is greater than the third number of music assets. In both cases, musical catalog amplification can be advantageous because it can provide the owner of the musical catalog (e.g., the artist or the record label, or some combination thereof) with more royalty-generating music assets and therefore higher revenues from sources like music streaming services.

Throughout this specification and the appended claims, reference is often made to music streaming services. A person of skill in the art will understand a music streaming service to be a remotely-accessed source of musical assets from or through which consumers may access (e.g., listen to) musical assets typically without needing to purchase copies of the assets themselves. Well known examples of music streaming service providers include Spotify, Apple Music, Google Play Music, and Tidal. Any particular music streaming service provider may deploy its own compensation scheme for the artists and/or record labels that make their music available through the music streaming service, such as for example a royalty model with revenues generated on a "per asset per play" basis. In the case of "per asset per play" royalties, total revenue is directly proportional to the total number of assets, and in accordance with the present systems, devices, and methods a musical catalog amplification service can help increase total revenue for an artist/record label by increasing the total number of assets by which revenues are generated.

The various implementations described herein include systems, devices, and methods for leveraging computer-generated musical compositions, and the systems by which they are generated, in the operation of a business. As an example, the computer-based musical compositions systems described herein may be operated as or incorporated into a musical catalog amplification service for existing music rights holders, wherein the computer-based musical composition systems described herein may be deployed to create musical variations of existing music or, more generally, new musical compositions based on or otherwise influenced by existing music (collectively, variations of existing music and new original compositions are referred to herein as "new music" and "new musical compositions"). For certainty, throughout this specification and the appended claims a musical variation is considered a form of musical composition and the term "musical composition" (as in, for example, "computer-based musical composition system") is used to include musical variations.

In the context of the present systems, devices, and methods, a "rights holder" is an entity (e.g., a person, a group of people, a company, an organization, or the like) who owns the at least some of the rights to one or more existing musical composition(s) and a "musical catalog amplification service provider" may include an owner/operator of (or business that leverages) a computer-based musical composition system used to generate new music based on or influenced by the existing musical composition(s). Any licensing revenue that may be generated from new music may, in some cases (e.g., where a piece of new music is clearly a variation of an existing composition), be shared between the rights holder of the existing composition and the catalog amplification service provider. For example, a piece of new music may be licensed to the original rights holder with some revenue share allocated to the catalog amplification service provider. The catalog amplification service provider may retain distribution rights to the new music and may, in some implementations, work with content users (e.g., artists, streaming service providers, and so on) to create finished or "more polished" versions of new music. The catalog amplification service provider may also earn revenue on use of new music outside of the operations of the rights holder or catalog amplification service provider.

In some implementations, future or subsequent variations or compositions based on or influenced by existing new music may be revenue shared but on a sliding scale, with a greater percentage of revenue share allocated to the catalog amplification service provider with each subsequent variation or composition generated.

Revenues may be shared or divided in a variety of different ways depending on factors such as the extent an original musical composition has been varied, the complexity of a variation or composition, and/or the number of rights holders involved. For example, revenues may be shared between more than two parties when new music is created by cross-breeding existing music from multiple different rights holders.

FIG. 1 is a flow diagram showing an exemplary method 100 of leveraging new music as a catalog amplification service provider in accordance with the present systems, devices, and methods. In accordance with the present systems, devices, and methods, a catalog amplification service provider may be a business that generates revenue by amplifying (e.g., expanding, adding to, or otherwise enhancing) the catalog (e.g., portfolio) of music content owned, licensed, or operated by a third party rights holder. Method 100 includes four acts 101, 102, 103, and 104, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 101, existing content owned by one or more rights holder(s) is analyzed by at least one processor of a computer-based musical composition system. The analysis may include any or all of the systems, devices, and methods described in any or all of the earlier patent filings incorporated by reference above. The existing content may include a single musical composition, multiple musical compositions by a single band or artist, or multiple musical compositions by multiple bands/artists. The content analyzed may all be owned by a single rights holder or it may be distributed across the respective portfolios of multiple different rights holders.

At 102, new music is generated based on the existing content analyzed at 101. The new music may include a single musical composition or multiple musical compositions, any or all of which may be characterized by minor variations that distinguish from the original content analyzed at 101 or by major differences that unambiguously qualify the musical compositions as "new" original musical compositions.

At 103, the new music generated at 102 is licensed back to the one or more rights holder(s). The license may include a licensing fee, or may be free of charge. In some implementations, ownership of the new music may be transferred to the rights holder(s) with a license back to the person, business, or entity performing method 100.

At 104, revenues generated from the new music are shared with the one or more rights holder(s) (i.e., shared between the one or more right holder(s) and the musica catalog amplification service provider). Various royalty models may be employed and the exact division of revenues may vary from implementation to implementation depending on a range of factors. For example, if the new music is only subtly different from the existing original musical composition(s) then the performer of method 100 (i.e., the musical catalog amplification service provider) may elect or be required to license the original musical composition(s), which may be factored into the royalty model for the new music. However, if the new music is sufficiently distinct from the existing original musical composition(s) such that the existing original musical composition(s) may be unambiguously seen as no more than "influences" on the new music (just as any one artist may be influenced by another artist without being said to "copy" the other artist) then no license to the existing original musical composition(s) may be necessary.

In some implementations, a musical catalog amplification service provider may operate as an "artificial intelligence record label" by creating and promoting variations of and or original compositions influenced by popular, well-known, and/or well-regarded music and sharing in the royalty stream from other parties involved, including without limitation: streaming service providers, performance revenues from artists, and revenues from related merchandise.

In some implementations, a musical catalog amplification service provider may operate as an "artificial intelligence artist" or "virtual artist," with, for example, a dedicated "artist" page on streaming service providers and with a corresponding revenue share calculated on a "per play" basis just like any other artist on the streaming service platform. In accordance with the present systems, devices, and methods, a "virtual artist" may or may not include a real human contributor. For example, if the music attributed to the virtual artist is completely autonomously generated by an artificial intelligence/computer-based musical composition system then the virtual artist may consist of only the artificial intelligence or hardware and/or software of the computer-based musical composition system (e.g., computer-based musical composition system 600 in FIG. 6, or solely the computer program product 650 thereof), whereas if the music attributed to the virtual artist has contributions from a real human, such as a user of the computer-based musical composition system and/or an artist who further refines, modifies, or polishes an output of the computer-based musical composition system, then the virtual artist may comprise the real human contributor in combination with an artificial intelligence or hardware and/or software of the computer-based musical composition system. In some implementations, the virtual artist may consist of only the human contributor.

In some implementations, the musical compositions generated by the computer-based musical compositions systems described herein are particularly well-suited for licensed use in applications where a low licensing fee is desired and limited focus is intended to be exclusively directed towards the artist of the composition and/or the music itself. Exemplary scenarios that may call for such application include background music in other entertainment media such as movies, television shows, radio shows, advertisements, commercials, video games, and the like. Thus, in some implementations the present systems, devices, and methods may be particularly well-suited for amplifying musical catalogs that are particularly populated with such ambient and/or background music.

Figure 2:
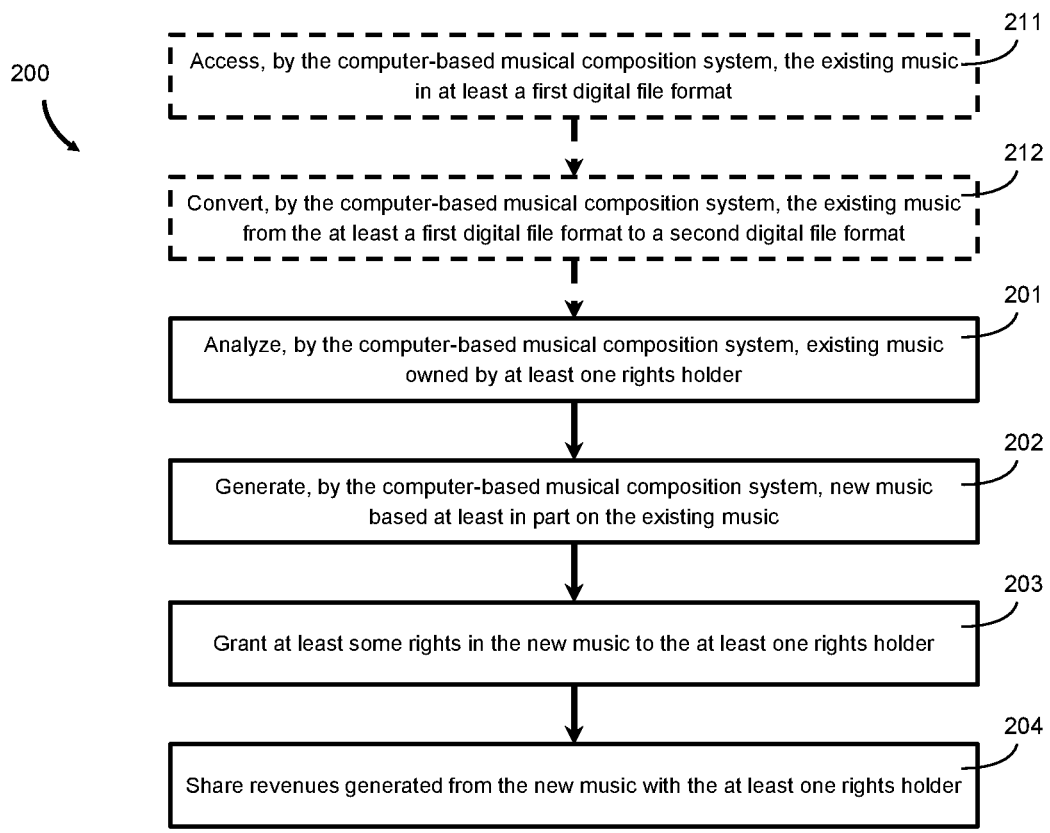
FIG. 2 is a flow diagram showing an exemplary method of leveraging, employing, or deploying a computer-based musical composition system to provide a musical catalog amplification service in accordance with the present systems, devices, and methods.

FIG. 2 is a flow diagram showing an exemplary method 200 of leveraging, employing, or deploying a computer-based musical composition system to provide a musical catalog amplification service in accordance with the present systems, devices, and methods. Method 200 includes four main acts 201, 202, 203, and 204 and two optional acts 211 and 212, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 201, the computer-based musical composition system analyzes existing music owned by at least one rights holder. In this context, the term "existing music" means music (e.g., a set of musical compositions, the set comprising at least one musical composition) that is in existence prior to the performance of method 200. The analysis performed by the computer-based musical composition system may employ a wide range of algorithms and/or machine learning techniques, including without limitation those described in previously referenced and incorporated U.S. patent application Ser. Nos. 16/775,241, 16/775,254, and/or 62/968,963. In analyzing the existing music, the computer-based musical composition system may determine or learn at least one feature of at least one musical composition in the existing music, such as for example: the instrument used per track; the musical role of each track (e.g., melody, harmony, bassline, ornamentation, primary-rhythm, secondary-rhythm, ornamentation-rhythm); the segmentation of the music into a contiguous sequence of abutting musically coherent "segments" (and the bars associated with each of them); the harmonic structure of the music within and across segments (i.e., which bars share common tonality); characteristic sequences of notes or intervals; the mood; or in general any characteristic or property of any portion of a musical composition (e.g., a bar) that can be measured, calculated, or determined and used to characterize at least some aspect(s) of the musical composition.

At 202, the computer-based musical composition system generates new music based at least in part on the existing music analyzed at 201. In this context, the term "new music" means music (e.g., a set of musical compositions, the set comprising at least one musical composition) that was not in existence prior to the performance of method 200 and is a result or product of the performance of method 200. Depending on the implementation, the computer-based musical composition system may generate new music at 202 substantially autonomously (i.e., with little to no user intervention) or with some influence from a user. For example, a user may specify (as inputs into the computer-based musical compositions system) high-level properties such as number of musical compositions, number and type of musical instrument(s), musical mood or ambiance, musical genre or style, degree/amount of variation from the existing music, and the like, and the computer-based musical composition system may generate the new music based on the user's specifications. If desired, the user may further modify, enhance, vary, or otherwise polish any output provided by the computer-based musical composition system. As a specific example, in some implementations the computer-based musical composition system may employ evolutionary/genetic algorithms to generate new music and a real human may contribute to, for example, the scoring or fitness function of an evolutionary/genetic algorithm.

In accordance with the present systems, devices, and methods, a computer-based musical composition system may generate new music more quickly than human musician(s) or composer(s), especially if a relatively large volume/quantity of new music is desired (e.g., to significantly amplify a musical catalog). In some cases, a computer-based musical composition system may also generate new music that better meets certain criteria relative to comparable new music generated by human musician(s) or composer(s). For example, once a computer-based musical composition system has analyzed (e.g., at 201) a set of existing music from a particular band or artist, the computer-based musical composition system may be better-suited than a human musician/composer to produce new music that emulates (or sounds as if it was generated by) the same band or artist. Thus, the present systems, devices, and methods provide a practical application of a computer-based musical composition system in which the computer-based musical composition system is applied to provide a musical catalog amplification service that is faster and of better musical quality than may be achieved by human musicians and composers alone.

In implementations of method 200 for which the analysis performed by the computer-based musical composition system at 201 includes determining at least one feature of the existing music, the computer-based musical composition system may at least partially base the new music generated at 202 on the at least one feature determined at 201. In other words, in generating new music at 202, the computer-based musical composition system may apply the at least one feature of the existing music determined at 201 to guide, form the foundation of, or otherwise influence the new music.

As previously described, in some implementations the existing music may include a catalog of musical compositions. In such implementations, at 202 the computer-based musical composition system may generate at least one new musical composition based at least in part on at least one musical composition in the catalog of musical compositions. The at least one new musical composition is necessarily influenced by the at least one musical composition in the catalog of musical compositions, but the degree to which the at least one new musical composition is influenced by, or based upon, the at least one musical composition in the catalog of musical compositions may vary in different implementations. Indeed, in some implementations a user of the computer-based musical composition system may control (e.g., by defining certain input parameters) the degree or amount of influence the at least one musical composition in the catalog of musical composition has on the at least one new musical composition generated by the computer-based musical composition system. For example, in some applications a user of the computer-based musical composition system, or a consumer of the musical catalog amplification service, may desire that the new music sound as though it has been generated by a particular existing source, such as a particular established artist or band. In such applications the new music generated by the computer-based musical composition system may advantageously sound quite similar to the existing music analyzed by the computer-based musical composition system. For example, at least one new musical composition generated by the computer-based musical composition system at 202 may comprise a musical variation of an existing musical composition from the catalog of existing musical composition analyzed by the computer-based musical composition system at 201.

In other applications, a user of the computer-based musical composition system, or a consumer of the musical catalog amplification service, may prefer that the new music not sound as though it has been generated by an existing source but rather sound as though it has been generated by an original source (or any of a variety of potential sources). In such applications the new music generated by the computer-based musical composition system may advantageously sound quite different and/or distinctive from the existing music analyzed by the computer-based musical composition system.

At 203, at least some rights in the new music generated at 202 are granted to the at least one rights holder by, for example, the musical catalog amplification service provider (e.g., by the business providing musical catalog amplification services). Depending on the specific implementation, this may be achieved in different ways. As a first example, at 203 the new music may be licensed to the at least one rights holder. A license may be most appropriate when the new music is fairly distinct from the existing music (i.e., the new music does not sound as though it has come from the same or a substantially similar source as the existing music) but the musical catalog amplification service provider nevertheless desires to acknowledge the influence the existing music has had on the generation of the new music. As a second example, at 203 ownership of the new music may be assigned to the at least one rights holder. Ownership assignment or transfer may be most appropriate when the new music is fairly similar to the existing music (i.e., the new music comprises and sounds like musical variations of the existing music, and/or the new music sounds as though it has come from the same or a substantially similar source as the existing music). In the case of ownership assignment, method 200 may advantageously further include licensing the new music back from the at least one rights holder, e.g., by the musical catalog amplification service provider. In some implementations, co-ownership of the new music between the at least one rights holder and the musical catalog amplification service provider may be effected.

In some implementations, a musical catalog amplification service provider may charge a lower fee (or receive a lower royalty rate) when it retains ownership of the new music generated in method 200 and it may receive a higher fee (or receive a higher royalty rate) when it retains only a license back to the new music generated in method 200 (and assigns ownership thereof to the at least one rights holder).

At 204, revenues generated from the new music are shared with the at least one rights holder. That is, revenues generated from the new music are distributed between the at least one rights holder and the musical catalog amplification service provider. Further exemplary details of revenue sharing are described in relation to FIG. 3.

As previously described, in addition to main acts 201, 202, 203, and 204, some implementations of method 200 may also include optional acts 211 and 212. When optional acts 211 and 212 are included in an implementation of method 200, they are generally performed before act 201 (i.e., before the computer-based musical composition system analyzes the existing music).

At 211, the computer-based musical composition system accesses the existing music in at least a first digital file format. When the existing music comprises a set of existing musical compositions, at 211 the computer-based musical composition system accesses the musical compositions in a first digital file format. Each musical composition may correspond to a respective digital file, or multiple musical compositions may be included in a single digital file. The first digital file format may be a conventional digital audio file format such as .mp3, .wav, .mid, or the like. When the existing music spans multiple digital files, each digital file may employ the same first digital file format or multiple different digital file formats may be employed. In alternative implementations, the existing music may be accessed in a non-audio digital file format, such as an electronic form of sheet music (e.g., a .pdf file, or other file type suitable for representing sheet music), or in an analog file format, or in the form of paper sheet music that must be "ingested" by the computer-based musical composition system (i.e., converted into a digital form).

Depending on the specific implementation, the digital file(s) embodying the existing music may be accessed remotely by the computer-based musical composition system (e.g., by download over the internet or through another connection to a remote server) or the digital file(s) embodying the existing music may be accessed locally by the computer-based musical composition system (e.g., by reading a memory or storage drive communicatively coupled to the computer-based musical composition system, such as a flash drive or the like).

At 212, the computer-based musical composition system converts the existing music from the at least a first digital file format to a second digital file format. The second digital file format may be a proprietary digital file format that is particularly well-suited for subsequent processing by the computer-based musical composition system. In implementations of method 200 that include optional act 212, the digital file format conversion may be performed to facilitate the analysis of the existing music performed by the computer-based musical composition system at 201. As an example, the second digital file format may include a hierarchical data structure such as the .hum file format described in U.S. Pat. No. 10,629,176.

Figure 3:
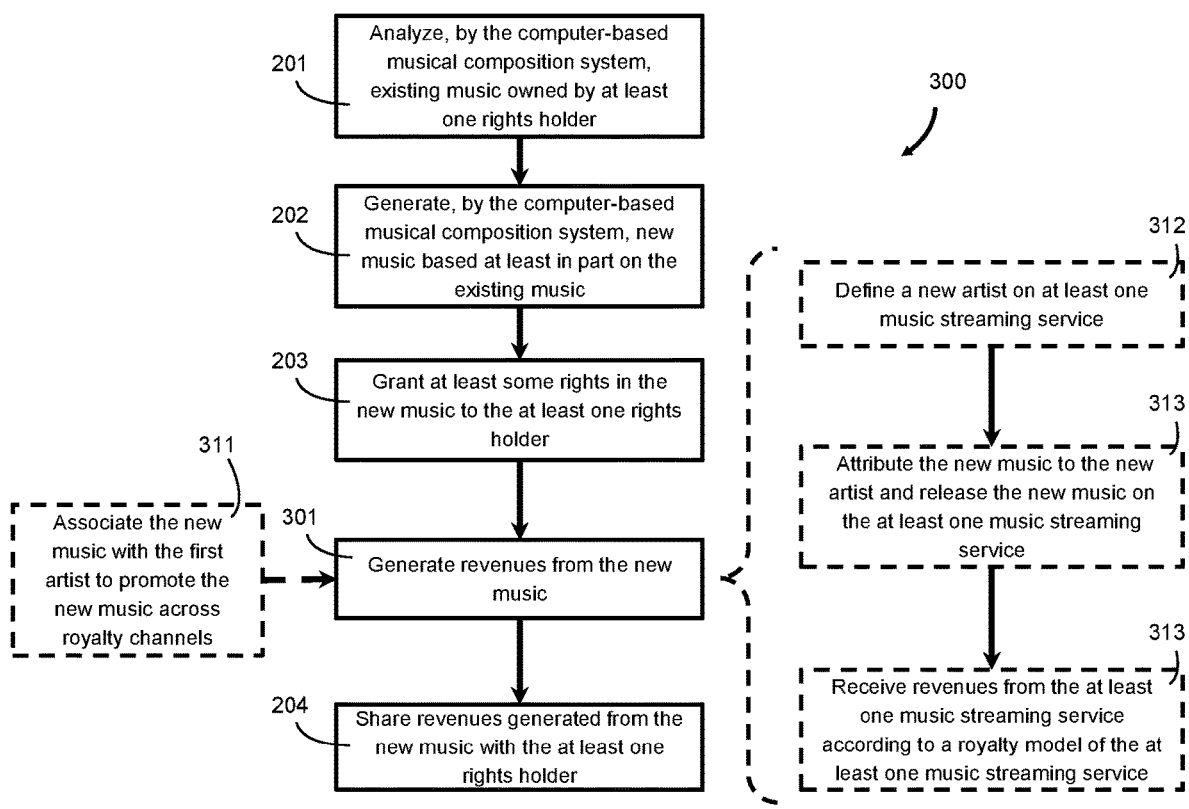
FIG. 3 is a flow diagram showing another exemplary method of leveraging, employing, or deploying a computer-based musical composition system to provide a musical catalog amplification service in accordance with the present systems, devices, and methods.

FIG. 3 is a flow diagram showing another exemplary method 300 of leveraging, employing, or deploying a computer-based musical composition system to provide a musical catalog amplification service in accordance with the present systems, devices, and methods. Method 300 includes acts 201, 202, 203, and 204 from method 200 and an additional act 301. Additional act 301 further includes or invokes either optional act 311 or optional acts 312, 313, and 314. Those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 301, revenues are generated from the new music. Revenues may be generated by (or for) either or both of the at least one rights holder and/or the musical catalog amplification service provider. Revenues may be generated in a variety of different ways depending on the specific implementation and the manner by which, or extent to which, rights are granted to the at least rights hodler at 203. A first exemplary path to revenue generation includes optional act 311 and a second exemplary path to revenue generation includes optional acts 312, 313, and 314.

At 311, the new music is associated with a particular artist in order to promote the new music across royalty channels. Optical act 311 may, for example, be well-suited for implementations where the existing music analyzed at 201 comprises music from at least a first artist and the new music generated at 202 comprises music of a similar quality to the music from the first artist (in other words, situations where the new music "sounds like" it originates from the first artist). In such implementations, revenues may be generated at 301 by associating the new music with the first artist to promote the new music across royalty channels. More specifically, the new music may be: made available on the artist page corresponding to the first artist on music streaming services, released on an album or as one or more single(s) in the name of the first artist, played or performed during concerts by the first artist, associated with merchandise that names the first artist, and so on.

In some implementations, method 300 may include optional act 311 when the musical catalog amplification service provider is supporting a real artist or record label, or acting as a virtual record label itself.

As an alternative to optional act 311, act 301 of method 300 may instead include or invoke optional acts 312, 313, and 314. In implementations of method 300 that include optional acts 312, 313, and 314, the musical catalog amplification service provider may be supporting a virtual artist, or acting as a virtual artist itself. Thus, optional acts 312, 313, and 314 may be well-suited for implementations where the existing music comprises music from at least one artist and the new music comprises music of a distinctive quality relative to the music from any one of the at least one artist(s) (in other words, situations where the new music does not sound like it originates from any particular existing artist whose work(s) was/were included in the existing music analyzed by the computer-based musical composition system at 201).

At 312, a new artist is defined on at least one music streaming service. For example, a new artist page may be created on at least one of Spotify, Apple Music, Google Play Music, Tidal, and/or another music streaming service. In accordance with the present systems, devices, and methods, the new artist may comprise a "virtual artist" as previously described. In some implementations, the new artist may be a real human artist (or band comprising real human artists) who did not previously have an artist page on the at least one music streaming service. In other implementations, an existing artist and artist page may be used for the purposes of optional act 312.

At 313, the new music is at least partially attributed to the new artist and released on the at least one music streaming service under the name of the new artist. For example, the new music may be made available on the artist page corresponding to the new artist on the music streaming service(s).

At 314, revenues are generated/received from the at least one music streaming service according to a royalty model of the at least one music streaming service. As an example, may music streaming services employ a "pay per play" model whereby artists receive a certain amount of revenue each time a music asset from their artist page is played by a user/subscriber of the music streaming service. The amount or revenue received per play is typically quite small (e.g., much less than a cent), which provides a mechanism by which a musical catalog amplification service can add value. All other things being equal (including average number of plays per music asset), "pay per play" revenues may increase as an artist's or record label's number of music assets increases, therefore the present systems, devices, and methods for musical catalog amplification can directly result in increased revenues for artists and record labels already receiving pay per play revenues.

The high-level business and legal concepts of granting rights and generating revenues that underlie acts 203 and 204 of methods 200 and 300 have broad applicability in the art; however, their specific utilization in connection with computer-based algorithmic musical composition in the present systems, devices, and methods represents a practical application of such high-level concepts in the provision of a musical catalog amplification service.

Throughout the descriptions of methods 200 and 300, reference is often made to "at least one" rights holder. In some implementations, the at least one rights holder may be a single rights holder; however, in other implementations the at least one rights holder may comprise multiple rights holders and certain acts of methods 200 and 300 may be extended or adapted to specifically accommodate multiple rights holders. An illustrative example of such is provided in FIG. 4.

Figure 4:
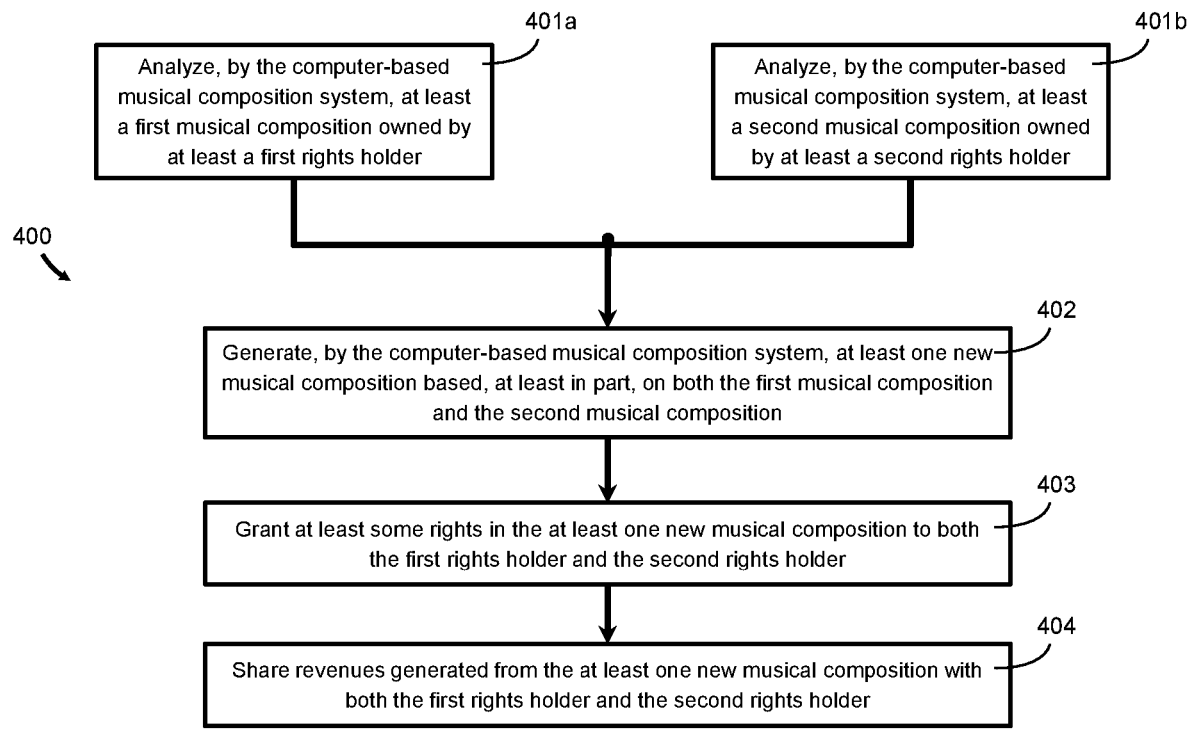
FIG. 4 is a flow diagram showing an exemplary method of leveraging, employing, or deploying a computer-based musical composition system to provide a musical catalog amplification service for multiple rights holders in accordance with the present systems, devices, and methods.

FIG. 4 is a flow diagram showing an exemplary method 400 of leveraging, employing, or deploying a computer-based musical composition system to provide a musical catalog amplification service for multiple rights holders in accordance with the present systems, devices, and methods. Method 400 is substantially similar to method 200 and includes all of the features and limitations described in relation to method 200, with the exception that method 400 is adapted to explicitly include existing music from multiple (i.e., a first and a second) rights holders. Method 400 includes five acts 401a/401b, 402, 403, and 404. Those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Acts 401a and 401b of method 400 generally correspond to respective instances of act 201 of method 200, where act 401a involves existing music from a first rights holder and act 401b involves existing music from a second rights holder. Thus, at 401a the computer-based musical composition system analyzes at least a first musical composition owned by at least a first rights holder and at 401b, the computer-based musical composition system analyzes at least a second musical composition owned by at least a second rights holder. The first rights holder may be different from the second rights holder. Act 401a and 401b may be performed in series or in parallel with one another. Prior to the analyses performed at 401a and 401b, the computer-based musical composition system may access (and optionally convert) the existing music in at least a first digital file format per acts 211 and 212 of method 200.

At 402, the computer-based musical composition system generates at least one new musical composition based, at least in part, on both the first musical composition analyzed at 401a and the second musical composition analyzed at 401b. That is, the at least one new musical composition may include, or be influenced by, one or more respective feature(s) present in each of the first musical composition analyzed at 401a and the second musical composition analyzed at 401b, such features determined as part of the analyses performed at 401a/401b.

At 403, at least some rights in the at least one new musical composition are granted to both (i.e., each of) the first rights holder and the second rights holder. Depending on the specific implementation, both the first rights holder and the second rights holder may be granted a license to the at least one new musical composition at 403 and ownership of the at least one new musical composition may be retained by the musical catalog amplification service provider, or a first one of the first rights holder and the second rights holder may be assigned ownership of the at least one new musical composition with a license to the at least one new musical composition granted to the other one of the second rights holder and the first rights holder (and a license to the at least one new musical composition also granted back to the musical catalog amplification service provider), or co-ownership of the at least one new musical composition may be assigned to both the first rights holder and the second rights holder (with a license granted back to the musical catalog amplification service provider).

At 404, revenues generated from the at least one new musical composition are shared with both the first rights holder and the second rights holder. That is, revenues generated from the at least one new musical composition are distributed between the first rights holder, the second rights holder, and the musical catalog amplification service. In some implementations, revenues generated by any one party are shared between all parties. In other implementations, any or all parties may be entitled to pursue revenues and keep all revenues that such party is able to generate. Revenues may be generated in a variety of different ways, including as described in relation to optional acts 311, 312, 313, and 314 of method 300.

Figure 5:
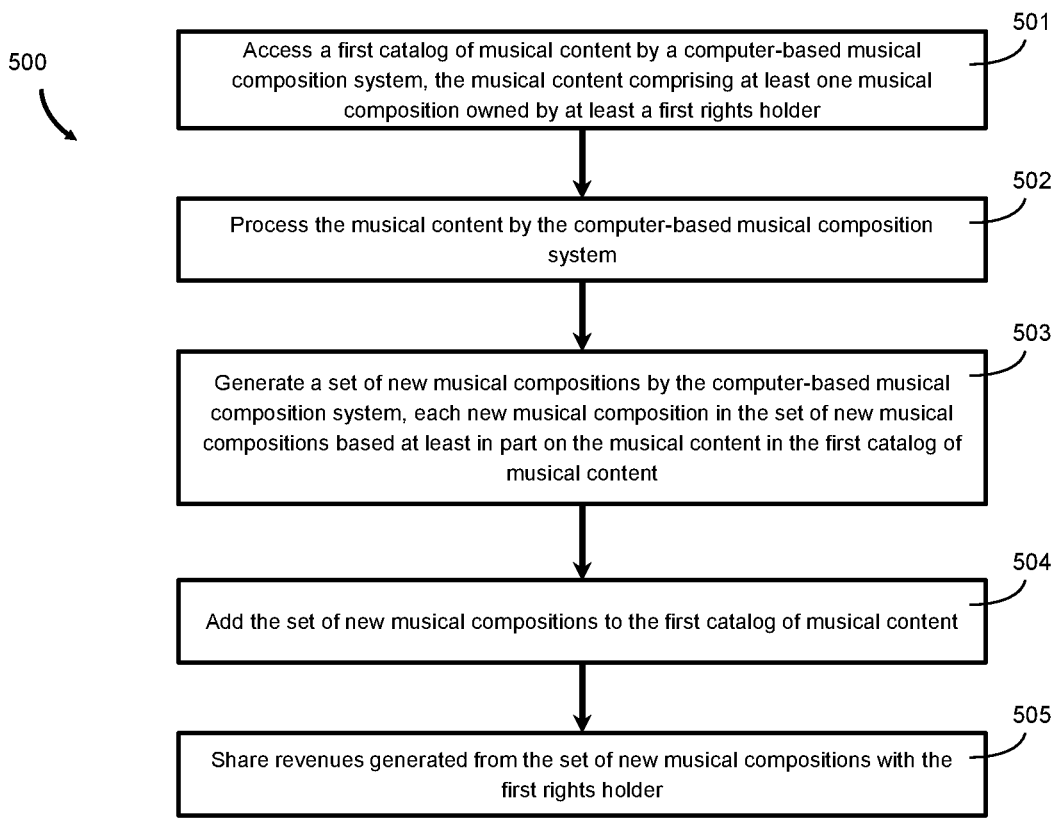
FIG. 5 is a flow diagram showing an exemplary method of operating a musical catalog amplification service in accordance with the present systems, devices, and methods.

In accordance with the present systems, devices, and methods, FIG. 5 is a flow diagram showing an exemplary method 500 of operating a musical catalog amplification service. Method 500 includes five acts 501, 502, 503, 504, and 505. Those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 501, a first catalog of musical content is accessed by a computer-based musical composition system. The musical content may comprise at least one musical composition owned by at least a first rights holder. As previously described, the musical content may be accessed remotely (e.g., via the internet) or locally (e.g., via a tethered connection to a physical storage medium) and the musical content may be accessed in at least a first digital file format (e.g, a digital audio file such as .mp3, or a non-audio digital file such as .pdf in the case of electronic sheet music) or in a non-digital form such as in the form of paper sheet music. Some implementations may further include accessing a second catalog of musical content, or accessing any number of additional catalogs of musical content, by the computer-based musical composition system.

At 502, the musical content (i.e., the first catalog of musical content and any additional catalogs of musical content) accessed at 501 is processed by the computer-based musical composition system. In some implementations, processing the musical content may include converting the musical content into a form that is well-suited to be further processed by the computer-based musical composition system, such as from the at least a first digital file format to a second digital file format (or from paper sheet music into the second digital file format) to facilitate or enable further processing of the musical content by the computer-based musical composition system. Processing the musical content may generally include analyzing the musical content. As previously described, analyzing the musical content may include determining at least one feature of the musical content.

At 503, a set of new musical compositions is generated by the computer-based musical composition system (e.g., to amplify the first catalog of musical content). The set of new musical compositions comprises at least one new musical composition and each new musical composition in the set of new musical compositions may be based at least in part on the musical content in the first catalog of musical content. As previously described, the computer-based musical composition system may generate at least one new musical composition based at least in part on at least one feature of the musical content in the first catalog of musical content, the at least one feature determined during the processing at 502. In some implementations, the computer-based musical composition system may generate, as a new musical composition in the set of new musical compositions, at least one musical variation of at least one musical composition in the first catalog of musical content.

As described previously, in some implementations method 500 may be applied across multiple catalogs of musical content. For example, a first catalog of musical content and a second catalog of musical content may both be accessed by the computer-based musical composition system at 501 and processed by the computer-based musical composition system at 502. In such implementations, at 503 the computer-based musical composition system may generate new musical compositions that are each based at least in part on both the musical content in the first catalog of musical content and the musical content in the second catalog of musical content.

At 504, the set of new musical compositions generated by the computer-based musical composition system at 503 is added to the first catalog of musical content, for example, to amplify the first catalog of musical content. Where multiple catalogs of musical content are accessed and processed and new musical compositions generated are based at least in part on musical content from multiple catalogs, the set of new compositions may be added to multiple catalogs of musical content (thereby amplifying multiple catalogs of musical content).

In general, adding the set of new musical compositions to the first catalog of musical content at 504 may include granting at least some rights in the set of new musical compositions to the at least one rights holder who owns the first catalog of musical content (or to the respective rights holders who own the respective catalogs of musical content when multiple catalogs of musical content are involved). As previously described, granting at least some rights in the set of new musical compositions to the at least one rights holder may include either: i) licensing the set of new musical compositions to the at least one rights holder; or ii) transferring ownership of the set of new musical compositions to the at least one rights holder and licensing the set of new musical compositions back from the at least one rights holder.

At 505, much like 204 of method 200 and method 300, revenues generated from the set of new musical compositions are shared (e.g., by the musical catalog amplification service provider) with the first rights holder. In other words, revenues generated from the set of new musical compositions are distributed between the musical catalog amplification service provider and the at least one rights holder. When multiple rights holders are involved (e.g., a second rights holder), revenues are shared between the musical catalog amplification service provider and all of the rights holders involved (e.g., a first rights holder and at least a second rights holder).

Similar to method 300, some implementations of method 500 may include generating revenues from the set of new musical compositions. Depending on the specific implementation, revenues may be generated by either or both of the musical catalog amplification service provider and/or the at least a first rights holder. When, for example, the first catalog of musical content comprises music from at least a first artist, revenues may be generated by, for example, associating the set of new musical compositions with the first artist to promote the set of new musical compositions across royalty channels similar to optional act 311 from method 300. When, for example, the first catalog of musical content comprises music from multiple artists and the set of new musical compositions comprises music of a distinctive quality relative to the music from any one of the multiple artists, such that the net of new musical compositions does not "sound like" it originated with any one of the multiple artists, revenues may be generated by, for example, defining a new artist on a music streaming service and releasing the set of new musical compositions under the name of the new artist on the music streaming service similar to optional acts 312, 313, and 314 from method 300.

The various implementations described herein include iterative methods whereby new music (i.e., new musical compositions) generated by the computer-based musical composition system in a first iteration of any of methods 100, 200, 300, 400, and/or 500 may be used as "existing music" or "a catalog of musical content" to seed a subsequent iteration of the method. For example, at 503 of method 500 the computer-based musical composition system may generate a first set of new musical compositions based at least in part on a first catalog of musical content owned by a first rights holder. At 505, then, revenues generated from the first set of new musical compositions with the first rights holder may be shared with the first rights holder such that a first portion of the revenues generated from the first set of new musical compositions goes to the first rights holder. In accordance with the present systems, devices, and methods, an iterative implementation of method 500 may then include generating a second set of new musical compositions by the computer-based musical composition system, each new musical composition in the second set of new musical compositions based at least in part on at least one new musical composition in the first set of new musical compositions. In this case, the second set of new musical compositions may still be based at least in part on the first catalog of musical content, and therefore the method may include adding the second set of new musical compositions to the first catalog of musical content; however, the second set of new musical compositions may be less directly based on the first catalog of musical content (due to the "one step removal" of the intervening first set of new musical compositions upon which the second set of new musical compositions are directly based), so a second portion of revenues generated from the second set of new musical compositions may be shared with the first rights holder, where the second portion of revenues associated with the second set of new musical compositions is less than the first portion of revenues associated with the first set of new musical compositions. For example, X % of revenues from the first set of new musical compositions may be shared with the first rights holder and Y % of revenues from the second set of new musical compositions may be shared with the first rights holder, where Y<X. From the perspective of the musical catalog amplification service provider (e.g., the business that uses the computer-based musical composition system to generate the first set of new musical compositions and the second set of new musical compositions), (100−X) % of revenues may be retained from the first set of new musical compositions and (100−Y) % of revenues may be retained from the second set of new musical compositions.

Throughout this specification and the appended claims, the term "first" and related similar terms, such as "second," "third," and the like, are often used to identify or distinguish one element or object from other elements or objects (as in, for example, "first note" and "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first note" simply refers to one particular note among other notes and does not necessarily require that such one particular note be positioned ahead of or before any other note in a sequence of notes; thus, a "first note" of a musical composition or bar is one particular note from the musical composition or bar and not necessarily the lead or chronologically-first note of the musical composition or bar.

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, exemplary computer systems suitable for implementing the present systems, devices, and methods are provided in FIG. 6.

Figure 6:
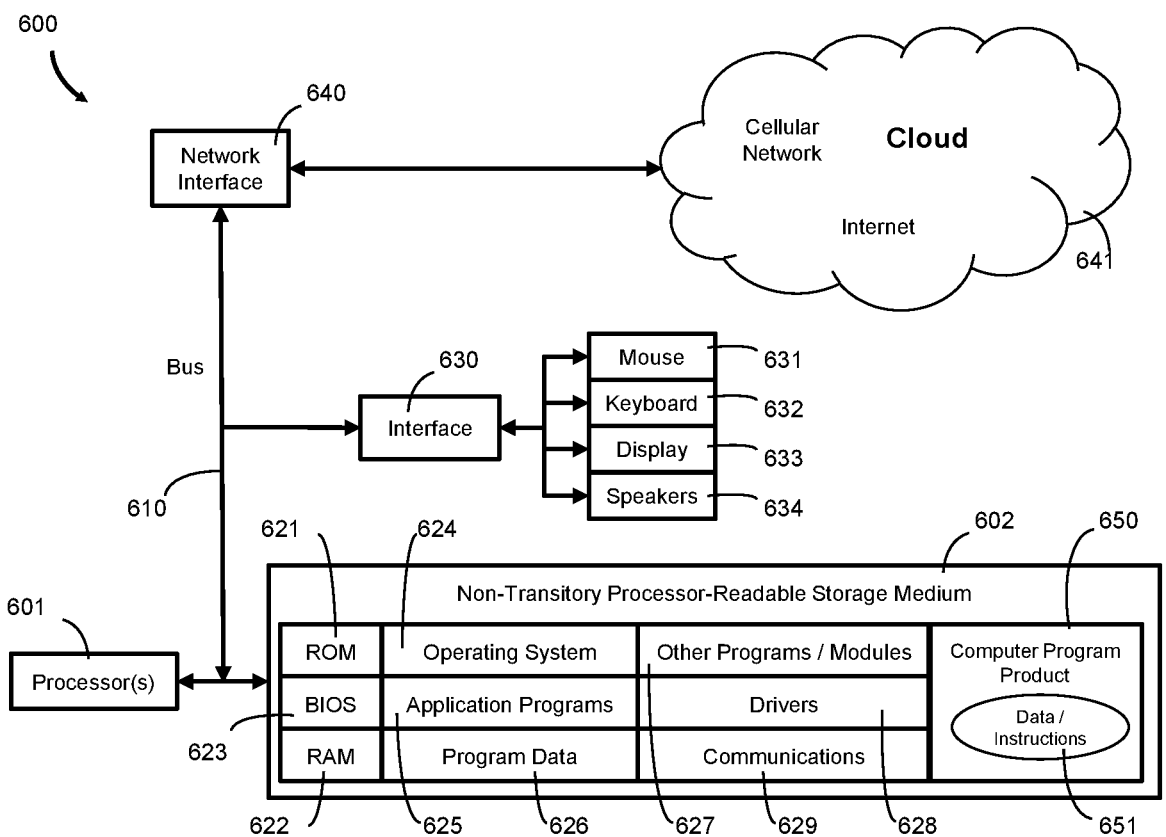
FIG. 6 is an illustrative diagram of a computer-based musical composition system leveraged or deployed to provide a musica catalog amplification service in the present systems, devices, and methods.

FIG. 6 is an illustrative diagram of an exemplary computer-based musical composition system 600 suitable at a high level for performing the various computer-implemented methods described in the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multi-processor systems, microprocessor-based or programmable consumer electronics, personal computers ("PCs"), network PCs, minicomputers, mainframe computers, and the like.

Computer-based musical composition system 600 includes at least one processor 601, a non-transitory processor-readable storage medium or "system memory" 602, and a system bus 610 that communicatively couples various system components including the system memory 602 to the processor(s) 601. Computer-based musical composition system 600 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68xxx series microprocessors from Motorola Corporation.

The processor(s) 601 of computer-based musical composition system 600 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 6 may be presumed to be of conventional design. As a result, such blocks need not be described in further detail herein as they will be understood by those skilled in the relevant art.

The system bus 610 in the computer-based musical composition system 600 may employ any known bus structures or architectures, including a memory bus with memory controller, a peripheral bus, and/or a local bus. The system memory 602 includes read-only memory ("ROM") 621 and random access memory ("RAM") 622. A basic input/output system ("BIOS") 623, which may or may not form part of the ROM 621, may contain basic routines that help transfer information between elements within computer-based musical composition system 600, such as during start-up. Some implementations may employ separate buses for data, instructions and power.

Computer-based musical composition system 600 (e.g., system memory 602 thereof) may include one or more solid state memories, for instance, a Flash memory or solid state drive (SSD), which provides nonvolatile storage of processor-executable instructions, data structures, program modules and other data for computer-based musical composition system 600. Although not illustrated in FIG. 6, computer-based musical composition system 600 may, in alternative implementations, employ other non-transitory computer- or processor-readable storage media, for example, a hard disk drive, an optical disk drive, or a memory card media drive.

Program modules in computer-based musical composition system 600 may be stored in system memory 602, such as an operating system 624, one or more application programs 625, program data 626, other programs or modules 627, and drivers 628.

The system memory 602 in computer-based musical composition system 600 may also include one or more communications program(s) 629, for example, a server and/or a Web client or browser for permitting computer-based musical composition system 600 to access and exchange data with other systems such as user computing systems, Web sites on the Internet, corporate intranets, or other networks as described below. The communications program(s) 629 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 6 as being stored locally in system memory 602, operating system 624, application programs 625, program data 626, other programs/modules 627, drivers 628, and communication program(s) 629 may be stored and accessed remotely through a communication network or stored on any other of a large variety of non-transitory processor-readable media (e.g., hard disk drive, optical disk drive, SSD and/or flash memory).

Computer-based musical composition system 600 may include one or more interface(s) to enable and provide interactions with a user, peripheral device(s), and/or one or more additional processor-based computer system(s). As an example, computer-based musical composition system 600 includes interface 630 to enable and provide interactions with a user of computer-based musical composition system 600. A user of computer-based musical composition system 600 may enter commands, instructions, data, and/or information via, for example, input devices such as computer mouse 631 and keyboard 632. Other input devices may include a microphone, joystick, touch screen, game pad, tablet, scanner, biometric scanning device, wearable input device, and the like. These and other input devices (i.e., "I/O devices") are communicatively coupled to processor(s) 601 through interface 630, which may include one or more universal serial bus ("USB") interface(s) that communicatively couples user input to the system bus 610, although other interfaces such as a parallel port, a game port or a wireless interface or a serial port may be used. A user of computer-based musical composition system 600 may also receive information output by computer-based musical composition system 600 through interface 630, such as visual information displayed by a display 633 and/or audio information output by one or more speaker(s) 634. Monitor 633 may, in some implementations, include a touch screen.

As another example of an interface, computer-based musical composition system 600 includes network interface 640 to enable computer-based musical composition system 600 to operate in a networked environment using one or more of the logical connections to communicate with one or more remote computers, servers and/or devices (collectively, the "Cloud" 641) via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, network interface 640 may include one or more wired or wireless communications interfaces, such as network interface controllers, cellular radios, WI-FI radios, and/or Bluetooth radios for establishing communications with the Cloud 641, for instance, the Internet or a cellular network.

In a networked environment, program modules, application programs or data, or portions thereof, can be stored in a server computing system (not shown). Those skilled in the relevant art will recognize that the network connections shown in FIG. 6 are only some examples of ways of establishing communications between computers, and other connections may be used, including wirelessly.

For convenience, processor(s) 601, system memory 602, interface 630, and network interface 640 are illustrated as communicatively coupled to each other via the system bus 610, thereby providing connectivity between the above-described components. In alternative implementations, the above-described components may be communicatively coupled in a different manner than illustrated in FIG. 6. For example, one or more of the above-described components may be directly coupled to other components, or may be coupled to each other via intermediary components (not shown). In some implementations, system bus 610 may be omitted with the components all coupled directly to each other using suitable connections.

In accordance with the present systems, devices, and methods, computer-based musical composition system 600 may be used to implement or in association with any or all of methods 100, 200, 300, 400, and/or 500 described herein and/or to encode, manipulate, vary, and/or generate any or all of the musical compositions described herein. Generally, computer-based musical composition system 600 may be deployed or leveraged to provide the musical catalog amplification services described throughout this specification and the appended claims. Where the descriptions of methods 100, 200, 300, 400, and 500 make reference to an act being performed by at least one processor or more generally by a computer-based musical composition system, such act may be performed by processor(s) 601 and/or system memory 602 of computer system 600.

Computer system 600 is an illustrative example of a system for performing all or portions of the various methods described herein, the system comprising at least one processor 601, at least one non-transitory processor-readable storage medium 602 communicatively coupled to the at least one processor 601 (e.g., by system bus 610), and the various other hardware and software components illustrated in FIG. 6 (e.g., operating system 624, mouse 631, etc.). In particular, in order to enable system 600 to implement the present systems, devices, and methods for musical catalog amplification services, system memory 602 stores a computer program product 650 comprising processor-executable instructions and/or data 651 that, when executed by processor(s) 601, cause processor(s) 601 to perform the various acts of methods 100, 200, 300, 400, and/or 500 that are performed by a computer-based musical composition system (e.g., accessing music, analyzing music, generating/varying music, and the like).

Throughout this specification and the appended claims, the term "computer program product" is used to refer to a package, combination, or collection of software comprising processor-executable instructions and/or data that may be accessed by (e.g., through a network such as cloud 641) or distributed to and installed on (e.g., stored in a local non-transitory processor-readable storage medium such as system memory 602) a computer system (e.g., computer system 600) in order to enable certain functionality (e.g., application(s), program(s), and/or module(s)) to be executed, performed, or carried out by the computer system.

The various embodiments of the present systems, devices, and methods described herein provide, among other things, business methods that leverage or deploy a computer-based musical composition system/capability. In some exemplary implementations, the present systems, devices, and methods combine highly technical computer-based algorithmic musical composition with business and legal principles such as rights, royalties, and revenues in order to produce a practical application. In doing so, the various implementations described herein improve the functioning of computer systems for the specific practical application of monetizing the algorithmic composition of music.

Throughout this specification and the appended claims, reference is often made to musical compositions being "automatically" generated/composed by computer-based algorithms, software, and/or artificial intelligence (AI) techniques. A person of skill in the art will appreciate that a wide range of algorithms and techniques may be employed in computer-generated music, including without limitation: algorithms based on mathematical models (e.g., stochastic processes), algorithms that characterize music as a language with a distinct grammar set and construct compositions within the corresponding grammar rules, algorithms that employ translational models to map a collection of non-musical data into a musical composition, evolutionary methods of musical composition based on genetic algorithms, and/or machine learning-based (or AI-based) algorithms that analyze prior compositions to extract patterns and rules and then apply those patterns and rules in new compositions. These and other algorithms may be advantageously adapted to exploit the features and techniques enabled by the digital representations of music described herein.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operating a computer-based musical composition system to amplify a catalog of background music, wherein the computer-based musical composition system includes a computer program product comprising processor-executable instructions and/or data, stored in a non-transitory processor-readable storage medium, that implement algorithms and artificial intelligence for analysis and autonomous composition of music, the method comprising:

accessing the catalog of background music by the computer-based musical composition system, wherein the catalog of background music comprises background musical compositions that are for use in other entertainment media, and wherein the catalog of background music is owned by at least one rights holder;

determining, by the computer-based musical composition system, at least one feature of at least one background musical composition in the catalog of background music;

generating, at least partially autonomously by the computer-based musical composition system, at least one new background musical composition based at least in part on the at least one feature of at least one background musical composition in the catalog of background music;

granting at least some rights in the at least one new background musical composition to the at least one rights holder; and sharing revenues generated from the at least one new background musical composition with the at least one rights holder.

2. The method of claim 1 wherein:

determining, by the computer-based musical composition system, at least one feature of at least one background musical composition includes determining, at least partially autonomously by the computer-based musical composition system, a mood of the at least one background musical composition; and generating, at least partially autonomously by the computer-based musical composition system, at least one new background musical composition based at least in part on the at least one feature of at least one background musical composition includes generating, at least partially autonomously by the computer-based musical composition system, at least one new background musical composition based at least in part on the mood of the at least one background musical composition.

3. The method of claim 2 wherein generating, at least partially autonomously by the computer-based musical composition system, at least one new background musical composition based at least in part on the mood of the at least one background musical composition includes generating, at least partially autonomously by the computer-based musical composition system, at least one new background musical composition having a same mood as the at least one background musical composition.

4. The method of claim 1 wherein the catalog of background music comprises background musical compositions that are each for use in at least one other entertainment medium selected from a group consisting of: a movie, a television show, a radio show, an advertisement, a commercial, and a video game.

5. The method of claim 4, further comprising:
generating revenues from at least one use of the at least one new background musical composition in at least one other entertainment medium.

6. A method of operating a computer-based musical composition system to amplify a catalog of music, wherein the computer-based musical composition system includes a computer program product comprising processor-executable instructions and/or data, stored in a non-transitory processor-readable storage medium, that implement algorithms and artificial intelligence for analysis and autonomous composition of music, the method comprising:

accessing the catalog of music by the computer-based musical composition system, the catalog of music owned by at least one rights holder and the catalog of music comprising at least one musical composition;

processing the catalog of music by the computer-based musical composition system;

at least partially autonomously generating a first set of new musical compositions by the computer-based musical composition system, the first set of new musical compositions comprising at least one new musical composition and each new musical composition in the first set of new musical compositions based at least in part on processing the catalog of music;

sharing a first percentage of revenues generated from the first set of new musical compositions with the at least one rights holder;

processing the first set of new musical compositions by the computer-based musical composition system;

at least partially autonomously generating a second set of new musical compositions by the computer-based musical composition system, the second set of new musical compositions comprising at least one new musical composition and each new musical composition in the second set of new musical compositions based at least in part on processing the first set of new musical compositions; and sharing a second percentage of revenues generated from the second set of new musical compositions with the at least one rights holder, the second percentage being less than the first percentage.

7. The method of claim 6, further comprising:
adding the first set of new musical compositions to the catalog of music, wherein processing the first set of new musical compositions by the computer-based musical composition system includes processing, by the computer-based musical composition system, the catalog of music after the first set of new musical compositions has been added thereto.

8. The method of claim 7 wherein at least partially autonomously generating a second set of new musical compositions by the computer-based musical composition system, the second set of new musical compositions comprising at least one new musical composition and each new musical composition in the second set of new musical compositions based at least in part on processing the first set of new musical compositions, includes at least partially autonomously generating a second set of new musical compositions by the computer-based musical composition system, the second set of new musical compositions comprising at least one new musical composition and each new musical composition in the second set of new musical compositions based at least in part on processing the catalog of music after the first set of new musical compositions has been added thereto.

9. A method of operating a computer-based musical composition system to amplify a catalog of music, wherein the computer-based musical composition system includes a computer program product comprising processor-executable instructions and/or data, stored in a non-transitory processor-readable storage medium, that implement algorithms and artificial intelligence for analysis and autonomous composition of music, the method comprising:

accessing the catalog of music by the computer-based musical composition system, the catalog of music owned by at least one rights holder and the catalog of music comprising at least one musical composition;

processing the catalog of music by the computer-based musical composition system;

at least partially autonomously generating a set of new musical compositions by the computer-based musical composition system, the set of new musical compositions comprising at least one new musical composition and each new musical composition in the set of new musical compositions based at least in part on processing the catalog of music;

controlling, by the computer-based musical composition system, a degree to which each new musical composition in the set of new musical compositions is based on processing the catalog of music; and sharing revenues generated from the set of new musical compositions with the at least one rights holder.

10. The method of claim 9 wherein controlling, by the computer-based musical composition system, a degree to which each new musical composition in the set of new musical compositions is based on processing the catalog of music includes controlling, by the computer-based musical composition system, an amount of influence that processing the catalog of music has on at least partially autonomously generating the set of new musical compositions by the computer-based musical composition system.

11. The method of claim 9 wherein controlling, by the computer-based musical composition system, a degree to which each new musical composition in the set of new musical compositions is based on processing the catalog of music includes controlling the computer-based musical composition system to at least partially autonomously generate at least one musical variation of a musical composition from the catalog of music, the at least one musical variation sounding similar to the musical composition from the catalog of music.

12. The method of claim 9 wherein controlling, by the computer-based musical composition system, a degree to which each new musical composition in the set of new musical compositions is based on processing the catalog of music includes controlling the computer-based musical composition system to at least partially autonomously generate at least one new musical composition with little influence from processing the catalog of music to produce at least one new musical composition that sounds different and distinctive from the catalog of music.

13. The method of claim 9 wherein controlling, by the computer-based musical composition system, a degree to which each new musical composition in the set of new musical compositions is based on processing the catalog of music includes:
   controlling the computer-based musical composition system to at least partially autonomously generate at least one musical variation of a musical composition from the catalog of music, the at least one musical variation sounding similar to the musical composition from the catalog of music; and
   controlling the computer-based musical composition system to at least partially autonomously generate at least one new musical composition with little influence from processing the catalog of music to produce at least one new musical composition that sounds different and distinctive from the catalog of music.

14. The method of claim 9 wherein sharing revenues generated from the set of new musical compositions with the at least one rights holder includes sharing a percentage of revenues generated from the set of new musical compositions, the percentage based at least in part on the degree to which each new musical composition in the set of new musical compositions is based on processing the catalog of music.

15. A method of operating a computer-based musical composition system to amplify a catalog of music, wherein the computer-based musical composition system includes a computer program product comprising processor-executable instructions and/or data, stored in a non-transitory processor-readable storage medium, that implement algorithms and artificial intelligence for analysis and autonomous composition of music, the method comprising:
   accessing the catalog of music by the computer-based musical composition system, the catalog of music owned by at least one rights holder;
   processing the catalog of music by the computer-based musical composition system;
   at least partially autonomously generating new music by the computer-based musical composition system, the new music based at least in part on processing the catalog of music;
   granting at least some rights in the new music to the at least one rights holder;
   generating revenues from the new music, wherein generating revenues from the new music includes:
      releasing the new music on at least one music streaming service;
      at least partially attributing the new music to the at least one rights holder on the at least one music streaming service; and
      receiving revenues from the at least one music streaming service;
   and
   sharing revenues generated from the new music with the at least one rights holder.

16. The method of claim 15, wherein generating revenues from the new music further includes:
   defining a new artist on the at least one music streaming service, wherein releasing the new music on at least one music streaming service includes at least partially attributing the new music to the new artist on the at least one music streaming service.

17. The method of claim 15 wherein the catalog of music comprises music from a first artist, and wherein at least partially autonomously generating new music by the computer-based musical composition system, the new music based at least in part on processing the catalog of music, includes at least partially autonomously generating at least one new musical composition having a similar quality to music from the first artist, and wherein releasing the new music on at least one music streaming service includes at least partially attributing the at least one new musical composition to the first artist on the at least one music streaming service.

18. The method of claim 17 wherein the at least one rights holder includes the first artist.

19. The method of claim 15 wherein the catalog of music comprises music from multiple artists, and wherein at least partially autonomously generating new music by the computer-based musical composition system includes at least partially autonomously generating new music of a distinctive quality relative to the music from any one of the multiple artists.

20. The method of claim 19 wherein the at least one rights holder includes the multiple artists.

* * * * *